United States Patent
Nishihara (10) Patent No.: US 7,962,691 B2
(45) Date of Patent: Jun. 14, 2011

(54) INFORMATION PROCESSING APPARATUS AND COMPUTER USABLE MEDIUM THEREFOR

(75) Inventor: Masahiro Nishihara, Aichi (JP)

(73) Assignee: Brother Kogyo Kabushiki Kaisha, Aichi (JP)

(*) Notice: Subject to any disclaimer, the term of this patent is extended or adjusted under 35 U.S.C. 154(b) by 586 days.

(21) Appl. No.: 12/073,835

(22) Filed: Mar. 11, 2008

(65) Prior Publication Data

US 2008/0229043 A1    Sep. 18, 2008

(30) Foreign Application Priority Data

Mar. 13, 2007    (JP) .................................. 2007-064097

(51) Int. Cl.
G06F 12/00    (2006.01)
(52) U.S. Cl. ..................................... 711/115; 348/231.2
(58) Field of Classification Search .................. 711/115; 348/231.2
See application file for complete search history.

(56) References Cited

U.S. PATENT DOCUMENTS

| 7,647,455 B2 * | 1/2010 | Kimura ......................... 711/151 |
| 2005/0110879 A1 * | 5/2005 | Izume et al. ................ 348/231.2 |
| 2006/0074925 A1 * | 4/2006 | Bixby et al. .................. 707/100 |
| 2006/0248041 A1 * | 11/2006 | Stevenson .......................... 707/1 |
| 2007/0198789 A1 * | 8/2007 | Clark et al. .................... 711/162 |

FOREIGN PATENT DOCUMENTS

| JP | 2006-121573 | 5/2006 |
| JP | 2006-285900 | 10/2006 |

* cited by examiner

*Primary Examiner* — Hashem Farrokh
(74) *Attorney, Agent, or Firm* — Scully, Scott, Murphy & Presser, P.C.

(57) ABSTRACT

An information processing apparatus capable of executing at least one information processing operation is provided. The information processing apparatus includes a process control system to execute one of the at least one information processing operation to a piece of data stored in a first data storage, which is indicated by a first storage name, when the piece of data in the first data storage is recognized. The information processing apparatus further includes the first storage name including a character string to specify the information processing operation to be performed, and a data relocating system to relocate the piece of data from the first data storage when the data processing operation is completed.

11 Claims, 7 Drawing Sheets

PRINT, Copies=5

FIG.5A

PRINT, Copies=5

INFORMATION PROCESSING APPARATUS AND COMPUTER USABLE MEDIUM THEREFOR

CROSS REFERENCE TO RELATED APPLICATION

This application claims priority from Japanese Patent Application NO. 2007-064097, filed on Mar. 13, 2007, the entire subject matter of which is incorporated herein by reference.

BACKGROUND

1. Technical Field

An aspect of the present invention relates to an information processing apparatus, which is capable of executing a predetermined process to inputted data, and computer usable medium therefor.

2. Related Art

Information processing apparatuses to apply predetermined processes to data stored in data storages have been used in various occasions. For example, a facsimile machine is disclosed in Japanese Patent Provisional Publication 2006-121573. In the publication, a data file stored in a directory in a removable medium is transmitted by the facsimile machine to another facsimile machine (receiver machine) identified by a facsimile number as a destination while the directory having the data file is provided with a directory name, which is identical to the destination facsimile number. Thus, a plurality of data files, each of which has a destination facsimile number as a directory name, can be transmitted to the respective receiver machines.

In the above configuration, the data files can be transmitted to the receiver machines when simply the removable medium is connected with the sender facsimile machine, and thus extra steps in which the user enters the facsimile numbers can be omitted. However, in the above configuration, after the processes to transmit the data files in the removable medium are completed, and the removable medium is once removed, the data files in the removable medium are redundantly read to be transmitted to the receiver machines if the same removable medium is connected once again with the sender facsimile machine. Thus, the receiver machines are obligated to receive the identical data redundantly.

Further, in the above configuration, transmission of the entire data files may not complete when a transmission error occurs in the sender facsimile machine. In this occasion, the transmission is resumed after the problem causing the error is solved or by switching the sender facsimile machine to another facsimile machine. However, when the transmission is resumed or the removable medium is connected with another machine, the entire data files are read anew to be transmitted, time to transmit the entire data files is required, and the receiver facsimile machines are again obligated to receive the identical data. It is noted that the redundancy of transmitting the identical data is not limited to the facsimile transmission, but may occur in printing operations in which data files stored in a removable medium are read to be printed.

SUMMARY

In view of the above, the present invention is advantageous in that an information processing apparatus, in which redundant transmission can be avoided, and a computer readable medium therefore are provided.

According to an aspect of the invention, there is provided an information processing apparatus capable of executing at least one information processing operation. The information processing apparatus includes a process control system to execute one of the at least one information processing operation to a piece of data stored in a first data storage, which is indicated by a first storage name, when the piece of data in the first data storage is recognized. The first storage name includes a character string to specify the information processing operation to be performed. The information processing apparatus further includes a data relocating system to relocate the piece of data from the first data storage when the data processing operation is completed.

With the information processing apparatus according to the above configuration, information concerning the location of the piece of data, including a path name, is modified when the information processing operation to the piece of data is completed. Therefore, when the same information processing operation is activated once again, the location information has been modified so that the piece of data is not redundantly used. Therefore, the information processing operation will not be repeated unnecessarily. In the above configuration, when the piece of data is relocated from the first data storage, the piece of data can be moved to a second data storage, which may be a root directory of a removable medium.

According to another aspect of the invention, there is provided an information processing apparatus capable of executing at least one information processing operation. The information processing apparatus includes a process control system to execute one of the at least one information processing operation to a piece of data stored in a data storage, which is indicated by a storage name, when the piece of data in the data storage is recognized. The storage name includes a character string to specify the information processing operation to be performed and a number of outcome to be made in the information processing operation. The information processing apparatus further includes a data name modifying system to modify a name of the piece of data by appending the numerical information included in the storage name to an original name of the piece of data, and a data name updating system to update the numerical information appended to the name of the piece of data when an information processing job to make an outcome is completed.

With the information processing apparatus according to the above configuration, the numerical information indicating the number of outcome of the information processing operation is appended to the name of the piece of data, and the appended number of outcome is updated when one information processing to make one outcome is completed. For example, when an outcome is making a copy of the piece of data, the number of copies to be made can be decremented by one when a print job to make a copy is completed. Thus, the number of outcome to be made can be effectively monitored during the information processing operation so that redundant information processing job can be avoided.

According to another aspect of the invention, there is provided a computer usable medium including computer readable instructions for controlling a computer, which is capable of executing at least one information processing operation, to process information by executing steps of executing one of the at least one information processing operation to a piece of data stored in a first data storage, being indicated by a first storage name, when the piece of data in the first data storage is recognized, the first storage name including a character string to specify the information processing operation to be performed, and relocating the piece of data from the first data storage when the data processing operation is completed.

With the computer usable medium having the computer readable instruction in the above configuration, information concerning the location of the piece of data, including a path name, is modified when the information processing operation to the piece of data is completed. Therefore, when the same information processing operation is activated once again, the location information has been modified so that the piece of data is not redundantly used. Therefore, the information processing operation will not be repeated unnecessarily.

According to another aspect of the invention, there is provided a computer usable medium including computer readable instructions for controlling a computer, which is capable of executing at least one information processing operation, to process information by executing steps of executing one of the at least one information processing operation to a piece of data stored in a data storage, being indicated by a storage name, when the piece of data in the data storage is recognized, the storage name including a character string to specify the information processing operation to be performed and a number of outcome to be made in the information processing operation modifying a name of the piece of data by appending the numerical information included in the storage name to an original name of the piece of data, and updating the numerical information appended to the name of the piece of data when an information processing job to make an outcome is completed.

With the computer usable medium having the computer readable instruction in the above configuration, the numerical information indicating the number of outcome of the information processing operation is appended to the name of the piece of data, and the appended number of outcome is updated when one information processing to make one outcome is completed. For example, when an outcome is making a copy of the piece of data, the number of copies to be made can be decremented by one when a print job to make a copy is completed. Thus, the number of outcome to be made can be effectively monitored during the information processing operation so that redundant information processing job can be avoided.

DETAILED DESCRIPTION

Hereinafter, an embodiment according to an aspect of the present invention will be described with reference to the accompanying drawings.

Figure 1:
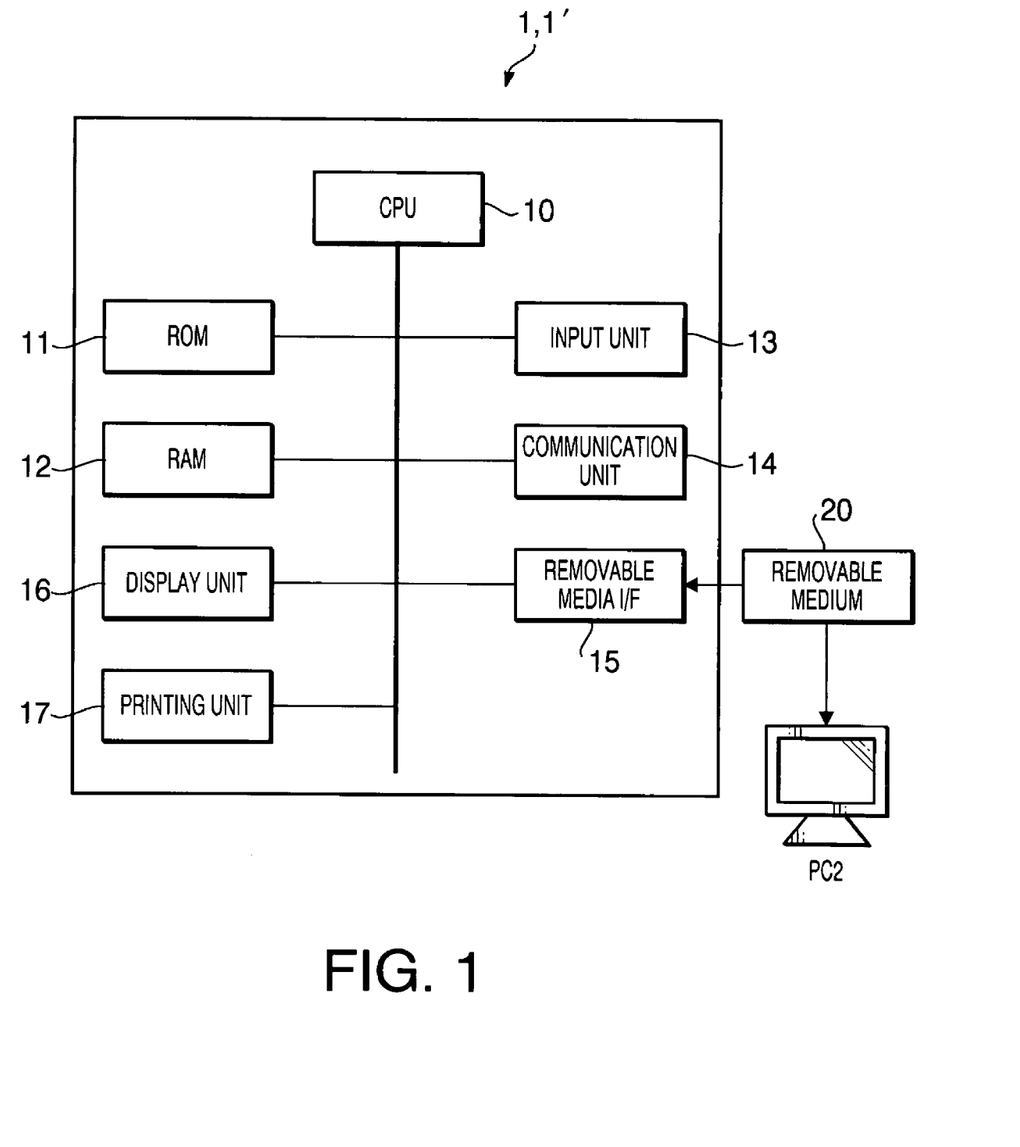
FIG. 1 is a block diagram to schematically illustrate a configuration of an information processing apparatus according to a first embodiment of the present invention.

FIG. 1 is a block diagram to schematically illustrate a configuration of an information processing apparatus 1 according to the first embodiment of the present invention. In the present embodiment, the information processing apparatus 1 is configured to print and transmit data representing an image. The data is generated in a computer such as a PC (personal computer) 2 and stored in a removable medium to be passed to the information processing apparatus 1.

As shown in FIG. 1, the information processing apparatus 1 is provided with a ROM 11, a RAM 12, an input unit 13, a communication unit 14, a removable media I/F (interface) 15, a display unit 16, and a printing unit 17. The ROM 11 stores programs to control operations of the information processing apparatus 1, while the RAM 12 temporally stores data in progress. The input unit 13 is provided so that the user can input various instructions to the information processing apparatus 1 therethrough. The communication unit 14 receives and transmits data through a telephone line and a communication network such as the internet. The removable media I/F 15 provides connection between a removable medium 20 and the information processing apparatus 1. The display unit 16 displays various information to be presented to the user. The printing unit 17 forms an image according to the image data inputted in the information processing apparatus 1. Further, the information processing apparatus 1 is provided with a CPU 10 to control the above components.

The removable medium 20 is a data storage unit such as a USB memory. In the present embodiment, the removable media I/F 15 includes a USB slot. Further, the ROM 11 stores a driver program to recognize and control the USB memory as a storage. It is noted that the removable medium 20 can include a memory stick (registered trademark), a compact flash (registered trademark), and a smartmedia (registered trademark).

Figure 2:
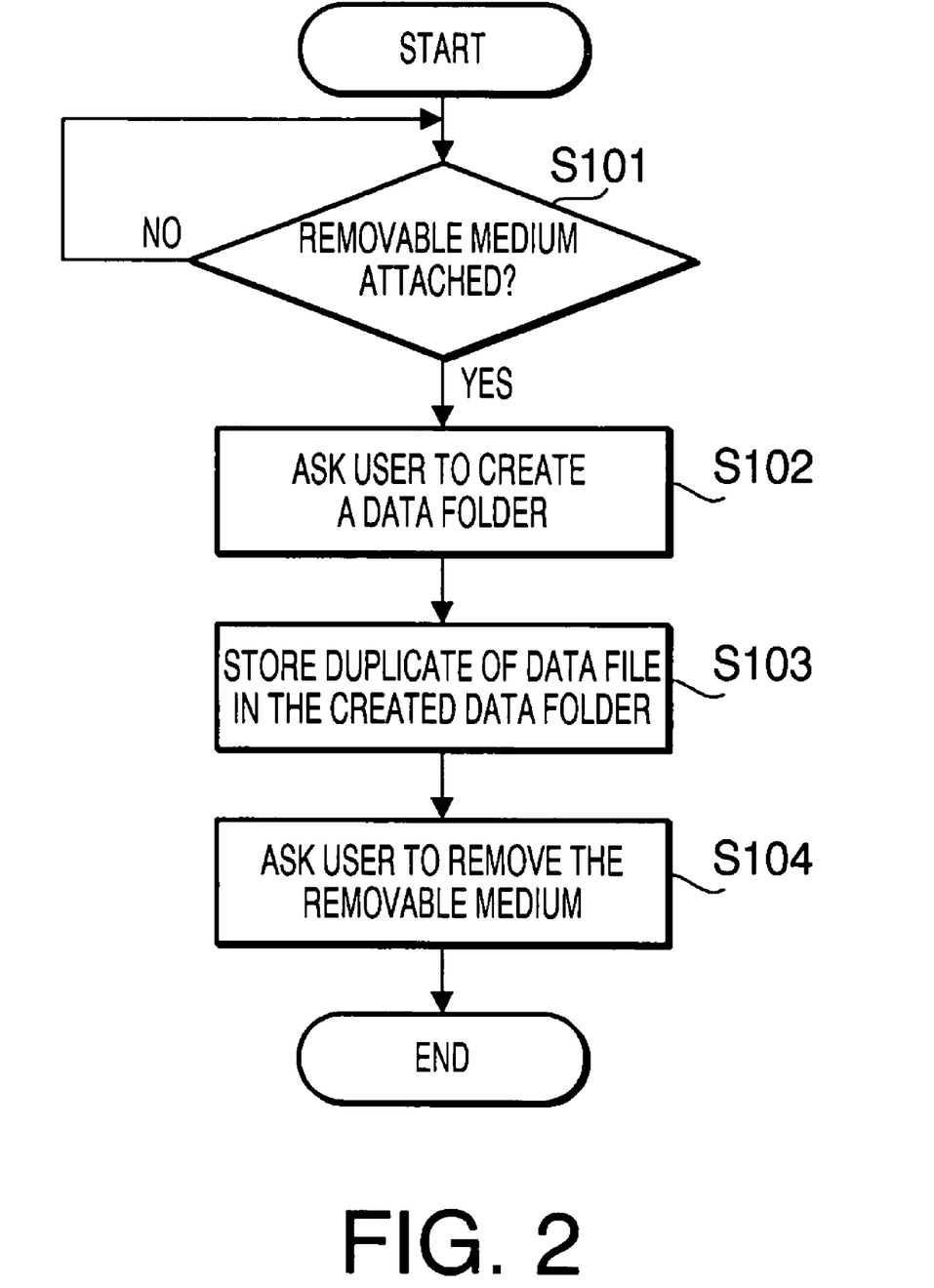
FIG. 2 is a flowchart to illustrate a preparation process to be performed in a computer according to the first embodiment of the present invention.

Next, a preparation process to be performed in the PC 2 will be described. FIG. 2 is a flowchart to illustrate the preparation process to be performed in the PC 2 according to the first embodiment of the present invention. The preparation process is performed when the removable medium 20 is connected with the PC 2 through an external I/F (not shown) of the PC 2. Prior to the process, a data file, which includes data representing for example an image to be printed, is created in the PC 2.

Figure 5A:
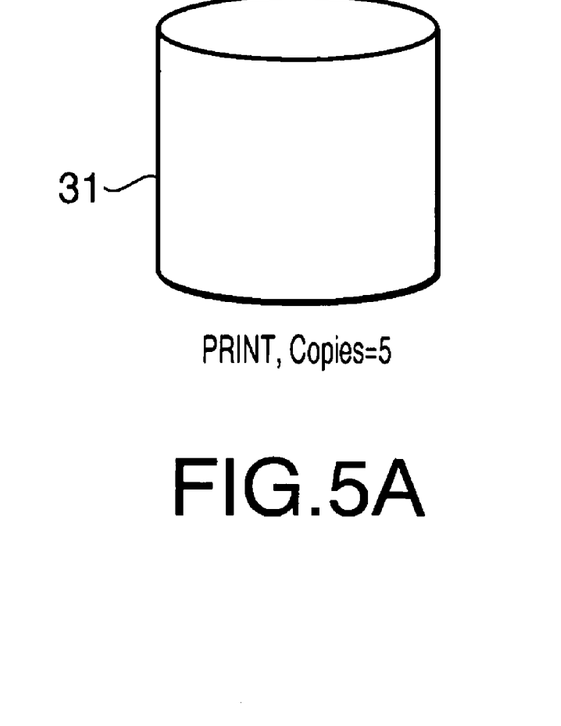
FIGS. 5A and 5B schematically illustrate data folders to store data files according to the first embodiment of the present invention.

When the process starts, in S101, it is judged as to whether the removable medium 20 is attached to the PC 2. If it is judged that the removable medium 20 is not attached (S101: NO), the process repeats S101. If it is judged that the removable medium 20 is attached (S101: YES), in S102, the user is required to create a data folder in a storage area of the removable medium 20. FIG. 5A schematically illustrates a data folder 31 created in S102 according to the first embodiment of the present invention. In S102, the user is further required to name the data folder 31. In the present embodiment, the data folder 31 is named as "PRINT, Copies=5".

The data folder created in S102 is named based on an operation of the information processing apparatus 1 to be performed on the data file, which will be stored later in the data folder 31. In the present embodiment, if the user intends to print the data file to make five copies, the data folder 31 is named as above ("PRINT, Copies=5") to indicate the intended operation. When the user intends to transmit the data file in facsimile, for example, the data folder is named as "FAX, Copies=1" to indicate that the facsimile transmission as the intended operation.

Thus, in the present embodiment, the data folder 31 created in S102 is provided with a name to indicate the intended operation of the information processing apparatus 1, while character strings, each of which can be a folder name, are stored in the ROM 11 respectively in association with operations to be performed to the data files which are to be stored in the data folders 31. The CPU 10 of the information processing apparatus 1 reads to the folder names, refers to the association, and performs the operation indicated by the folder name.

Figure 5B:
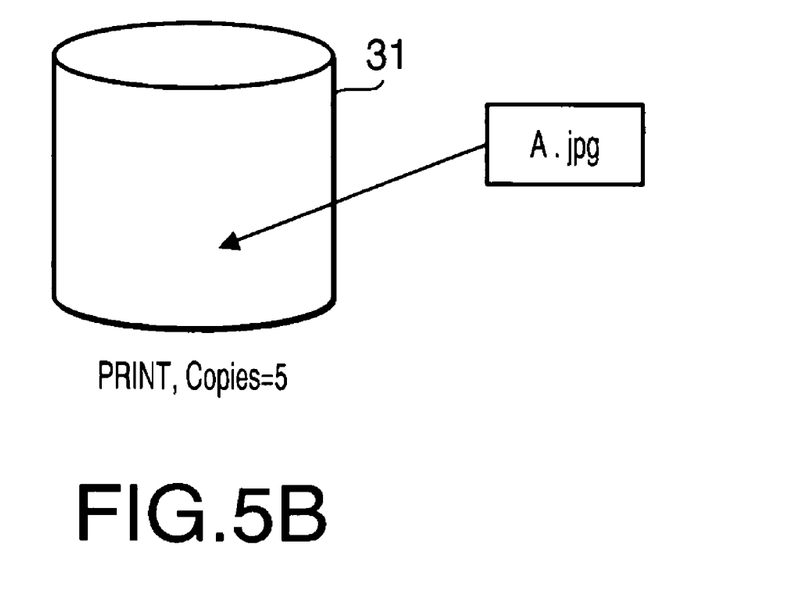

Following S102, in S103, the user is required to create and store a duplicate of the data file 32 (see FIG. 6) in the data folder 31 having the name "PRINT, Copies=5". In this step, the duplicated data file 32 is provided with a name "A.jpg". FIG. 5B schematically illustrates the data folder 31 to store data file 32 "A.jpg" according to the first embodiment of the present invention. Next, in S104, the user is required to remove the removable medium 20 from the PC 2 and attach the same to the information processing apparatus 1. The process is terminated thereafter. The information processing apparatus 1 will read the data file 32 and perform operations according to the folder name of the data folder 31.

Figure 3:
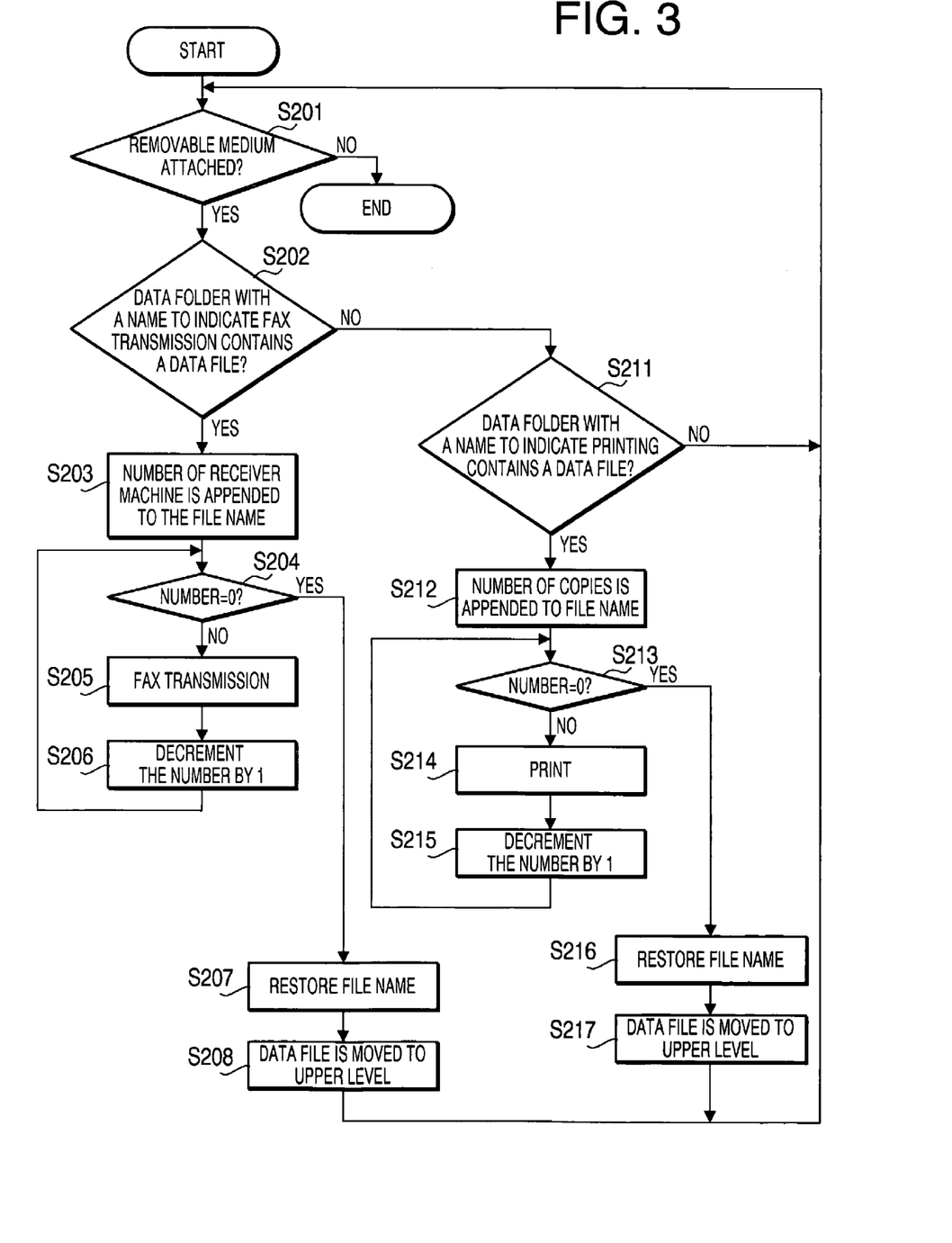
FIG. 3 is a flowchart to illustrate a facsimile transmission/printing process according to the first embodiment of the present invention.

Next, a facsimile transmission/printing process performed in the information processing apparatus 1 according to the first embodiment of the present invention will be described. FIG. 3 is a flowchart to illustrate the facsimile transmission/printing process according to the first embodiment of the present invention. The facsimile transmission/printing process is performed according to an image processing program, which is stored in the ROM 11.

As the process starts, in S201, it is judged as to whether the removable medium 20 is attached to the removable media I/F 15. If the removable medium 20 is not attached (S201: NO), the process is terminated. If the removable medium 20 is attached (S201: YES), in S202, it is judged as to whether the removable medium 20 contains a data folder with a folder name, which indicates facsimile transmission as the operation to be performed, having a data file therein. If it is judged that a data folder 31 having the folder name which indicates facsimile transmission as the operation to be performed is included, and a data file is contained therein (S202: YES), the process proceeds to S203.

In the present case, however, the name of the data folder 31 is "PRINT, Copies=5" (see FIGS. 5A and 5B), which indicates printing as the operation to be performed. Therefore, in S202, it is judged that the data folder 31 does not have the folder name which indicates facsimile transmission as the operation to be performed (S202: NO). Following S202, in S211, it is judged as to whether the removable medium 20 contains a data folder with a folder name, which indicates printing as the operation to be performed, having a data file therein. If it is judged that no data folder with a folder name which indicates printing as the operation to be performed, having a data file is contained (S211: NO), the process returns to S201. If it is judged that the data file 32 is contained in the data folder 31 (S211: YES), the process proceeds to S212, and thereafter, the data file 32 contained in the data folder 31 is read and stored in the RAM 12 to be processed. In this regard, the user may be notified of status of the printing operation (i.e., printing jobs, each of which corresponding to one copy to be made, to make five copies of the data file 32 is in progress) through the display unit 16 of the information processing apparatus 1.

Figure 6:
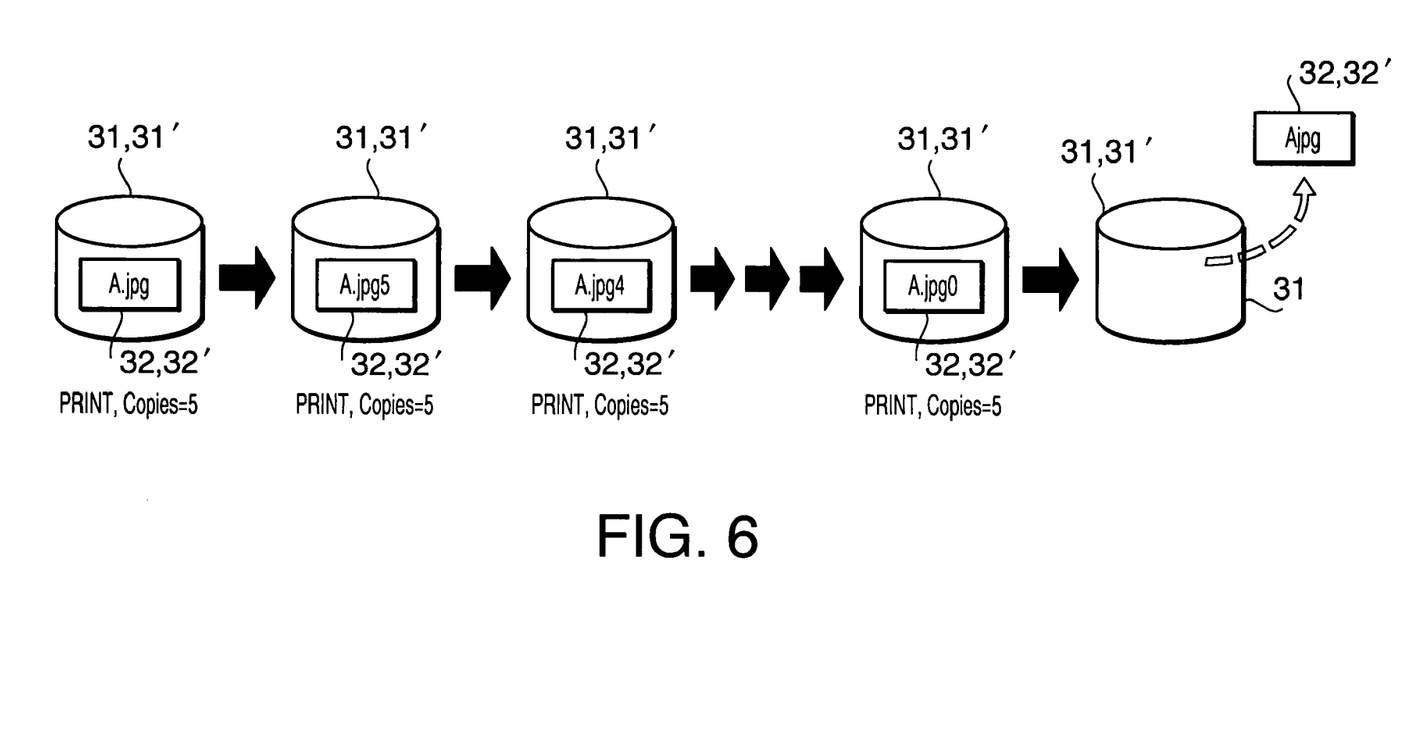
FIG. 6 schematically illustrates transition of the data file during the printing process according to the first embodiment of the present invention.

Following S212, the data file 32 having the file name "A.jpg" is processed to be printed in the printing unit 17 of the information processing apparatus 1. FIG. 6 schematically illustrates transition of the data file 32 during the printing operation according to the first embodiment of the present invention. In S212, the name "PRINT, Copies=5" of the data folder 31 is referred to and the number "5", which indicates the number of copies to be made, is appended to the name "A.jpg" of the data file 32 in the data folder 31. That is, the file name "A.jpg" is replaced with "A.jpg5". Thus, the number of copies to be made is appended to the file name of the data file 32, and in the following steps, the number is decremented by one as a copy of the data in the data file 32 is made.

In S213, it is judged as to whether the number appended to the name of the data file 32 is zero. If the number is not zero (S213: NO), in S214, the data included in the data file 32 is printed in the printing unit 17. Upon completion of the printing job to make one copy, in S215, the name of the data file 32 in the removable medium 20 is replaced with a new file name, which has a number to indicate the number of copies to be made at its end. In this step, the number of copies is decremented by one from the previous number appended to the file name. That is, in the present case, the file name "A.jpg5" is replaced with a new file name "A.jpg4". The process returns to S213 thereafter and repeats S214 and S215 until the number appended to the file name becomes zero. When five copies of the data file 32 are made, the file name becomes "A.jpg0", which indicates that no further printing of the data file 32 is required (S213: YES).

Thus, when the printing jobs to make five copies of the data file 32 complete, in S216, the file name of the data file 32 is restored to the original file name, i.e., "A.jpg". Thereafter, in S217, the location of the data file 32 is changed. I.e., the data file 32 is relocated from the data folder 31 to an upper level of the directory in the removable medium 20. Therefore, the data folder 31 having the folder name "PRINT, Copies=5" no longer contains the data file 32. Thereafter, the process returns to S201. When the steps following S201 are repeated, however, the data folder 31 no longer contains the data file 32 (S211: NO), therefore, the steps S201, S202, and S211 are repeated until the removable medium 20 is removed from the information processing apparatus 1. When the removable medium 20 is removed (S201: NO), the process is terminated.

As described above, in the information processing apparatus 1 according to the present embodiment, the number of copies to be made is appended to the name of the data file and decremented by one as one copy is made. When the number of copies becomes zero, i.e., when the designated number of copies are made, the data file 32 is relocated from the data folder 31 to another location (in S217). In this configuration, when the same removable medium 20 is attached to the information processing apparatus later, the data file 32 is not contained in the data folder "PRINT, Copies=5" (S211: NO). Therefore, it can avoid the data file 32, which has been already printed, to be repeatedly printed unnecessarily.

Next, a flow to transmit a data file via facsimile by the information processing apparatus 1 will be described. In the present embodiment, the facsimile transmission of a data file and printing of the same data file are conducted serially by the information processing apparatus 1, which is a multi-function device. However, it is noted that facsimile transmission can be conducted separately from the printing operation.

Prior to the process, a data file, which includes data representing for example an image to be transmitted, is created in the PC 2, and the user is required to create a data folder 42 in the removable medium 20, create a duplicate of the data file, and name the data folder 42 to be "fax, Copies=1". Further, the user is required to store the duplicated data file 43 in the data folder 42. In this regard, if the removable medium 20 contains solely the data folder 42, the information processing apparatus 1 executes a transmitting operation of the data file 43 when the removable medium 20 is attached thereto. However, if the removable medium 20 contains another data folder, which has a name indicating printing as the operation to be performed, a printing operation for the data file contained in the data folder will be performed following the facsimile transmitting operation.

Figure 7A:
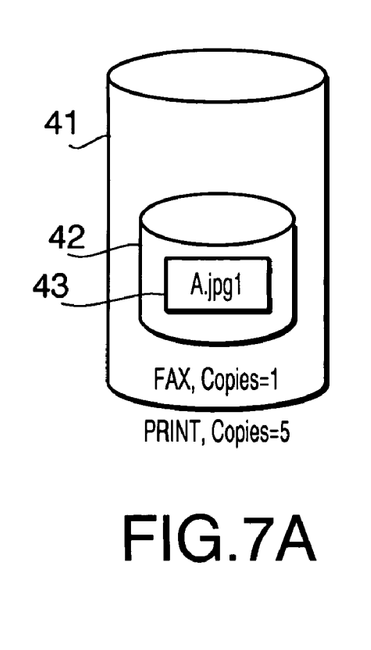
FIGS. 7A-7C schematically illustrate data folders to store a data file according to the first embodiment of the present invention.
Figure 7B:
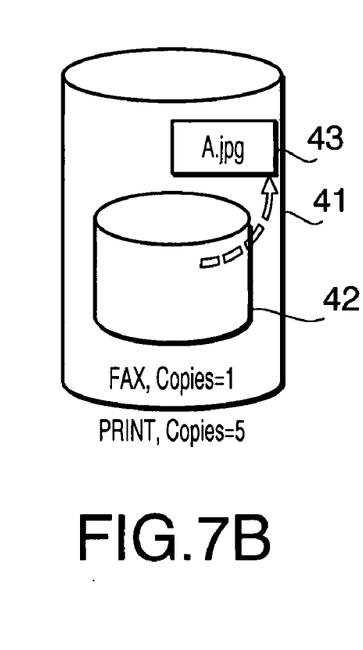
Figure 7C:
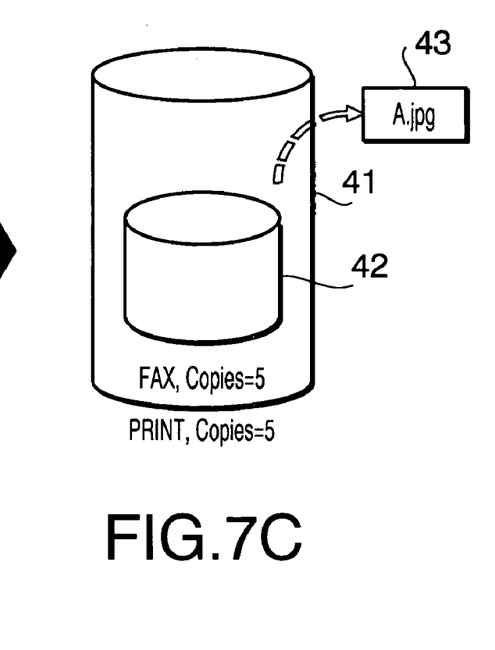

When the printing operation is performed following the facsimile transmitting operation, data folders, each of which contains the identical data file, can be prepared for facsimile transmission and printing respectively. Alternatively, the data folder 42 for facsimile transmission can be stored in another data folder 41 in a nested structure, as shown in FIGS. 7A-7C. FIGS. 7A-7C schematically illustrate the data folders 41, 42 in the nested structure to store the data file 43 according to the first embodiment of the present invention.

The data folders 41, 42 in the nested structure to store the data file 43 are created in the removable medium 20 according to the preparation process as shown in FIG. 2. In the process, the data folder 41 having a folder name "PRINT, Copies=5" and the data folder 42 having the folder name "FAX, Copies=1" nested in the data folder 41 are created. Further, the data folder 42 contains the data file 43 having a file name "A.jpg". When the removable medium 20 containing the data folders 41, 42 is attached to the information processing apparatus 1, the facsimile transmission/printing process is started.

As the process starts, steps S201 is performed as described above. In S202, it is judged as to whether the removable medium 20 contains a data folder with a folder name, which indicates facsimile transmission as the operation to be performed, having a data file therein. In the present case, the name of the data folder 42 is "FAX, Copies=1" (see FIGS. 7A-7C), which indicates facsimile transmission as the operation to be performed (S202: YES). Following S202, the process proceeds to S203, and thereafter, the data file 43 contained in the data folder 42 is read and stored in the RAM 12 to be processed. In this regard, the user may be notified of status of the facsimile transmission operation through the display unit 16 of the information processing apparatus 1.

The steps following S203 are performed similarly to the steps S212-S215 of the printing operation described above. That is, in S203, the number (i.e., 1) of receiver facsimile machine to be transmitted is appended to the file name of the data file 43 (i.e., the file name is "A.jpg1"). In S204, it is judged as to whether the number appended to the name of the data file 43 is zero. If the number is not zero (S204: NO), in S205, the data included in the data file 43 is transmitted through the communication unit 14. Upon completion of the transmission of the data file 43, in S206, the name of the data file 43 in the removable medium 20 is replaced with a new file name, which has a number decremented by one at its end. In this step, the number decremented by one from the previous number (i.e., 1) is appended to the file name. That is, in the present case, the file name "A.jpg1" is replaced with a new file name "A.jpg0". The process returns to S204 thereafter. Accordingly, in S204, it is judged that the number appended to the name of the data file 43 is zero (S204: YES). The process proceeds to S207.

In S207, the file name of the data file 43 is restored to the original file name, i.e., "A.jpg". Thereafter, in S208, the location of the data file 43 is changed. I.e., the data file 43 is relocated from the data folder 31 to an upper level of the directory in the removable medium 20, i.e., in the data folder 41 having the folder name "PRINT, Copies=5". Therefore, the data folder 42 having the folder name "FAX, Copies=1" no longer contains the data file 43 (see FIG. 5B). The process returns to S201. When the steps following S201 are repeated, however, the data folder 42 no longer contains the data file 43 (S202: NO), and the process proceeds to S211.

Thereafter, in S211, it is judged as to whether the removable medium 20 contains a data folder with a folder name, which indicates printing as the operation to be performed, having a data file therein. In this step, it is judged that the data folder 41 having a folder name "PRINT, Copies=5" contains the data file 43 (S211: YES), and the data file 43 in the RAM 12 is processed in S212-S215.

Thus, when the printing operation to make five copies of the data file 43 completes, in S216, the file name of the data file 43 is restored to the original file name, i.e., "A.jpg". Thereafter, in S217, the data file 32 is relocated from the data folder 31 to an upper level of the directory in the removable medium 20. Therefore, the data folder 31 having the folder name, "PRINT, Copies=5" no longer contains the data file 43 (see FIG. 7C). Thereafter, the process returns to S201. When the steps following S201 are repeated, however, the data folder 41 no longer contains the data file 43 (S211: NO), therefore, the steps S201, S202, and S211 are repeated until the removable medium 20 is removed from the information processing apparatus 1. When the removable medium 20 is removed (S201: NO), the process is terminated.

In the above flow, the data file 43 is relocated from one location to another location (i.e., from the data folder 42 to the data folder 41 in S208, and from the data folder 41 to the upper directory in S217). Therefore, when the removable medium 20 once removed from the information processing apparatus 1 is attached once again to the information processing apparatus 1, redundant facsimile transmission and printing of the data file 43, which has been previously transmitted and printed, can be effectively avoided. Specifically, when a printing operation of the data file 43 following a facsimile transmitting operation is desired, the user may erroneously remove the removable medium 20 after the facsimile transmission and before the printing operation. In such a case, redundant facsimile transmission can be avoided when the user attempts to resume the printing operation and attaches the removable medium 20 once again to the information processing apparatus 1.

In the above flow, the data file 43 is moved out of the data folders 42, 41 in S208 and S217 respectively in order to avoid redundant operations. However, the data folders 42, 41 can be respectively deleted when the data file 43 is removed therefrom. It is noted that if the empty data folders 42, 41 are maintained, the CPU 10 of the information processing apparatus unnecessarily searches through the data folders 42, 41 for a data file in S202, S211. Therefore, deleting the data folders 42, 41 when the data file 43 is removed can be effective in reducing workload of the information processing apparatus 1.

When the PC 2 is connected with the information processing apparatus 1 through a network such as a LAN, the data file created in the PC 2 can be passed to the information apparatus through the network. In such a case, a duplicate of the created data file is stored in a data folder with a name, which indicates an operation to be performed and a number of copies to be made, and relocated to a shared folder in a storage unit (not shown) of the information processing apparatus 1. The facsimile transmission/printing process as shown in FIG. 3 is performed to the duplicated data file stored in the shared folder accordingly. When the process is completed, the data file is moved out of the data folders in the storage unit so that redundant transmission and printing can be prevented. Further, with the PC 2 being connected with the information processing apparatus 1 through the LAN, the facsimile transmission/printing process (FIG. 3) is configured such that the step (S201) to judge as to whether the removable medium 20 is attached to the PC 2 is omitted.

In the information processing apparatus 1 described above, upon facsimile transmission and printing, intermediate data optimized for facsimile transmission and printing is generated based on the data files created in the PC 2. The intermediate data can be provided with a predetermined file extension (e.g., ".temp") and stored in, for example, the data folder (e.g., the data folder 42 and the data folder 41) created in the removable medium 20. The intermediate data is thereafter used in the transmission and printing operations. When the facsimile transmission and the printing process in progress is aborted by an error in the information processing apparatus 1, and the user is urged to resume the operation in another information processing apparatus 1' (see FIG. 1), it is required to generate the intermediate data anew in the information processing apparatus 1'. However, in a configuration described below, the intermediate data once created in the information processing apparatus 1 can be utilized in the information processing apparatus 1'. Further, when the user attempts to complete the operations in the information processing apparatus 1', it may be desirable to resume the operations so that solely the remaining tasks to transmit and print can be performed to complete the facsimile transmission and the printing process rather than starting the facsimile transmission and the printing process anew.

Figure 4:
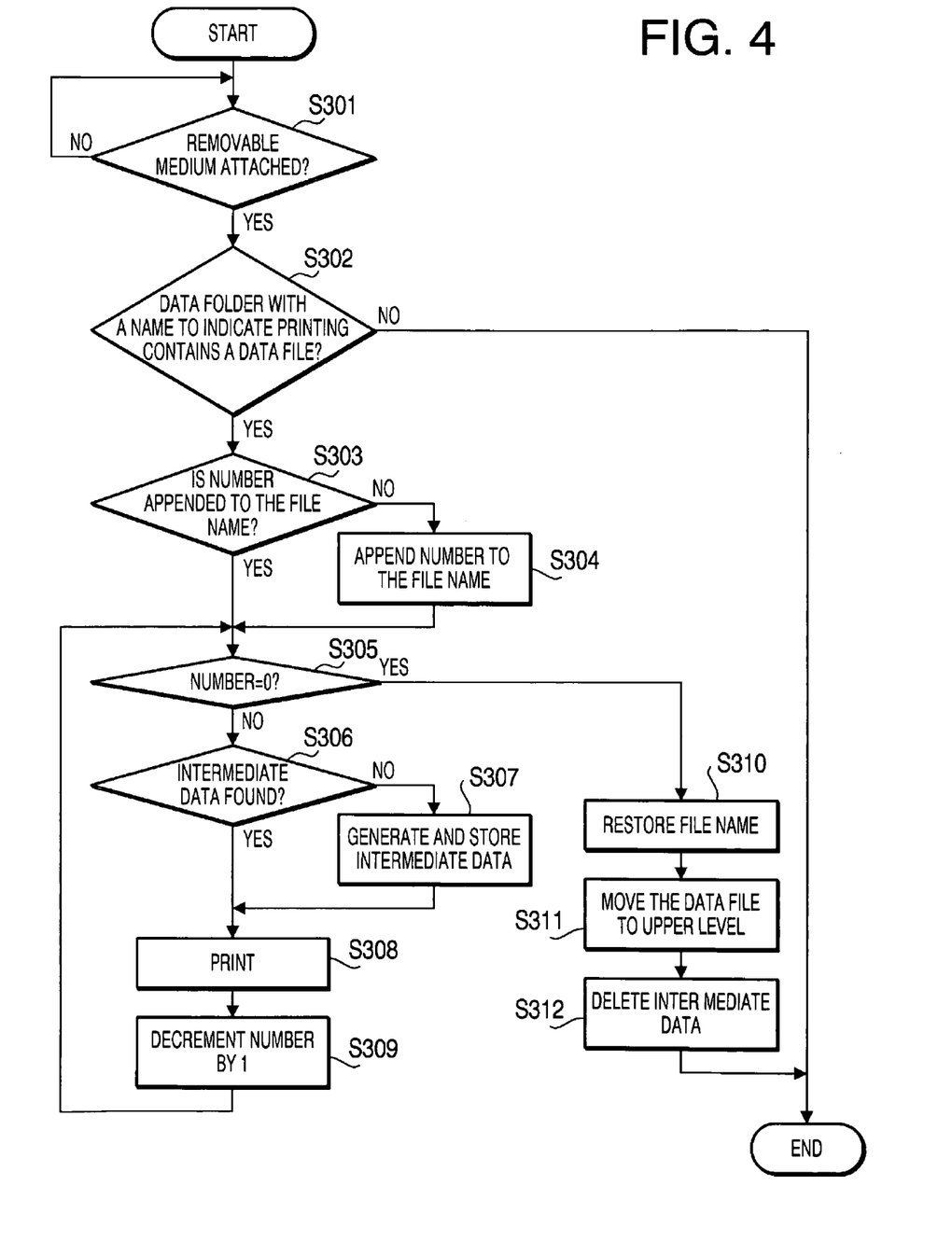
FIG. 4 is a flowchart to illustrate a printing process in another information processing apparatus according to a second embodiment of the present invention.

In the following embodiment, the information processing apparatus 1', which undertakes the remaining tasks for the facsimile transmission and the printing process when the facsimile transmission and the printing operation were ceased incomplete, will be described. FIG. 4 is a flowchart to illustrate a printing process in the information processing apparatus 1' according to the second embodiment of the present invention. In the information processing apparatus 1', a controlling program to control the printing process is stored in the ROM 11. In the following description, the printing process to be performed in the information processing apparatus 1' will be described, however, a process for facsimile transmission can be similarly performed. Further, a facsimile transmission/printing process in the information processing apparatus 1' can be performed similarly to the process described above and shown in FIG. 3.

In the present embodiment, similarly to the previous embodiment, a data file 32' (see FIG. 6) created in the PC 2 is stored in the removable medium 20 to be printed, and the removable medium 20 is removed from an information processing apparatus which ceases the printing process in progress in a reason concerning an error.

As the process starts, in S301, it is judged as to whether the removable medium 20 is attached to the removable media I/F 15. If the removable medium 20 is not attached (S301: NO), the process repeats S301. If the removable medium 20 is attached (S301: YES), in S302, it is judged as to whether the removable medium 20 contains a data folder 31' (see FIG. 6) with a folder name, which indicates printing as the operation to be performed, having a data file therein. If it is judged that a data folder 31' having the folder name which indicates printing as the operation to be performed is included, and a data file 32' is contained therein (S302: YES), the process proceeds to S303. The data file 32' contained in the data folder 31' is read and stored in the RAM 12 to be processed.

In S303, it is judged as to whether a number of copies to be made is appended to the name of the data file 32' in the data folder 31'. It should be noted that the name of the data file 32' should be appended the number to indicate the number of copies to be made if the removable medium 20 is removed from the previous information processing apparatus 1 during the printing process. In S303, if it is judged that the number is appended (S303: YES), in S305, it is judged as to whether the number is zero. If, for example, two copies of the data file 32' have been made in the previous printing process, the number appended to the file name is "3". Meanwhile, if no copy has been made in the previous printing process, no number is appended to the file name (S303: NO). Accordingly, in S304, the number "5" is appended to the file name, and the process proceeds to S305.

In S305, if it is judged that the number appended to the file name is not zero (S305: NO), the printing operation is performed. In the printing operation, intermediate data optimized for the operation is generated in the information processing apparatus 1' based on the file data 32'. However, the intermediate data generated in the previous information processing apparatus 1 may be stored in the removable medium 20 during the previous process. Therefore, in S306, the intermediate data is searched for in the removable medium 20. If the intermediate data is found (S306: YES), in S308, the intermediate data is utilized for the printing operation. In S306, if the intermediate data is not found (S306: NO), in S307, the intermediate data is generated anew and stored in the removable medium 20. Accordingly, the process proceeds to S308.

Following S308, when a copy of the data file 32' is made, in S309, the number appended to the file name is decremented by one (see FIG. 6). Thereafter, the process returns to S305 and repeats S305-S309 until the number appended to the file name becomes zero (S305: YES). Thereafter, in S310, the file name is restored to the original file name, and in S311, the data file 32' is moved out of the data folder 31' in the upper level of the directory in the removable medium 20. Therefore, the data folder 31' no longer contains the data file 32'. In addition, after completion of making the specified number of copies of the data file 32', the intermediate data will not be used, therefore, in S312, the intermediate data is removed from the removable medium 20.

As described above, in the information processing apparatus 1' according to the present embodiment, in S309, the number of copies to be made is appended to the name of the data file and decremented by one as one copy is made. Further, in S303, the number of copies to be made is checked so that the remaining number of copies to be made can be continuously made when the removable medium 20 is transferred to another information processing apparatus 1' before the previous facsimile transmission/printing process is completed. Therefore, the originally specified number of copies can be made and transmitted even when the information processing apparatus 1 is aborted and the information processing apparatus 1' takes over the remaining process. Thus, redundant printing and transmission can be effectively avoided.

Further, in the above process, the intermediate data is generated and stored in the removable medium 20 in S307. Therefore, when the removable medium is transferred to another information processing apparatus 1' during the facsimile transmission and printing process, it is not necessary that the information processing apparatus 1' generates the identical intermediate data anew. Thus, processing time to complete the facsimile transmission and printing process in the information processing apparatus 1' which takes over the process can be effectively shortened compared to processing time to start and complete the process anew.

Although examples of carrying out the invention have been described, those skilled in the art will appreciate that there are numerous variations and permutations of the information processing apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the information processing apparatuses 1, 1' are multi-function peripherals having the communication unit 14 and the printing unit 17. However, the information processing apparatuses 1, 1' can be configured to be an independent printing apparatus and a facsimile machine.

For another example, in the above embodiments, the number of copies to be made is indicated in the folder name, and the number is decremented by one as a copy is made. In facsimile transmission, similarly, a plural number can be included in the folder name. In that case, the number indicates a number of receiver facsimile machines to receive the data file 43. Further, instead of the number to indicate the number of receiver facsimile machines, the folder name can include a plural sets of telephone numbers, to which the data file 43 is transmitted respectively. For example, when each of the sets of telephone numbers include ten digits, and three sets of telephone numbers are designated as the receiver facsimile machines, the folder name can include 30 digits of numbers following "FAX,". In such a configuration, the telephone numbers can be deleted set-by-set (i.e., ten digits at a time) as a transmission job to one receiver facsimile machine is completed.

Still further, the data to be represented by the data files 32, 32', 43 is not limited to image data, but may be, for example, text data and document data as long as the data file is readable to be processed by the information processing apparatuses 1, 1'.

Furthermore, in the first embodiment, the data file 43 is contained in the data folder 42 and the data folder 41 in the nested structure. However, the data folders may not necessarily be in the nested structure. For example, the folder name of the first data folder can be configured to include a character string, which corresponds to a folder name of the second data folder. When the data file completes the process in the first data folder and is relocated from the first data folder to the second data folder, the data file can be relocated according to the character string contained in the folder name of the first data folder.

What is claimed is:

1. An information processing apparatus capable of executing at least one information processing operation, comprising:
    a process control system to execute one of the at least one information processing operation to a piece of data stored in a first data storage, being indicated by a first storage name, when the piece of data in the first data storage is recognized, the first storage name including a character string to specify the information processing operation to be performed; and
    a data relocating system to relocate the piece of data from the first data storage to a second data storage when the data processing operation is completed,
    wherein the first storage name includes numerical information to indicate a number of outcome to be made in the information processing operation, and
    the process control system repeats an information processing job corresponding to the outcome for the number of times indicated by the numerical information.

2. The information processing apparatus according to claim 1,
    wherein the second data storage is indicated by a second storage name, which includes a character string to specify the information processing operation to be performed,
    wherein the process control system executes another one of the at least one information processing operation to the piece of data relocated in the second data storage when the piece of data stored in the second data storage is recognized.

3. The information processing apparatus according to claim 2,
    wherein the second storage name includes numerical information to indicate a number of outcome to be made in the information processing operation; and
    wherein the process control system repeats an information processing job corresponding to the outcome for the number of times indicated by the numerical information being included both in the first storage name and the second storage name.

4. The information processing apparatus according to claim 1,
    wherein the first data storage and the second data storage are in a nested structure, in which the second data storage includes the first data storage.

5. The information processing apparatus according to claim 1, further comprising:
    a memory unit to store intermediate data created in association with the one of the at least one information processing operation based on the piece of data,
    wherein existing intermediate media stored in the memory unit is utilized upon executing the one of the at least one information processing operation when the existing intermediate media is found in the memory unit.

6. The information processing apparatus according to claim 1, further comprising:
    a data name modifying system to modify a name of the piece of data by appending the numerical information included in the first storage name to an original name of the piece of data; and
    a data name updating system to update the numerical information appended to the name of the piece of data when an information processing job to make an outcome is completed.

7. The information processing apparatus according to claim 6,
    wherein the name of the piece of data is restored to the original name when the information processing job corresponding to the outcome is repeated for the number of time indicated by the numerical information being included in the first storage name.

8. The information processing apparatus according to claim 6,
    wherein the data name modifying system maintains a current name of the piece of data when the current name is provided with the numerical information.

9. The information processing apparatus according to claim 6,
    wherein the name of the piece of data is restored to the original name when the information processing job is repeated for the number of time indicated by the numerical information being included in the first storage name.

10. The information processing apparatus according to claim 6, comprising:

a memory unit to store intermediate data created in association with the one of the at least one information processing operation based on the piece of data, wherein existing intermediate media stored in the memory unit is utilized upon executing the one of the at least one information processing operation when the existing intermediate media is found in the memory unit.

11. A computer usable medium comprising computer readable instructions for controlling a computer, capable of executing at least one information processing operation, to process information by executing steps of:

executing one of the at least one information processing operation to a piece of data stored in a data storage, being indicated by a storage name, when the piece of data in the data storage is recognized, the storage name including a character string to specify the information processing operation to be performed, and numerical information to indicate a number of outcome to be made in the information processing operation;

relocating the piece of data from the data storage when the data processing operation is completed; and repeating an information processing job corresponding to the outcome for the number of times indicated by the numerical information.

* * * * *